A. ROBERTS.
COKE OVEN.
APPLICATION FILED SEPT. 8, 1919.

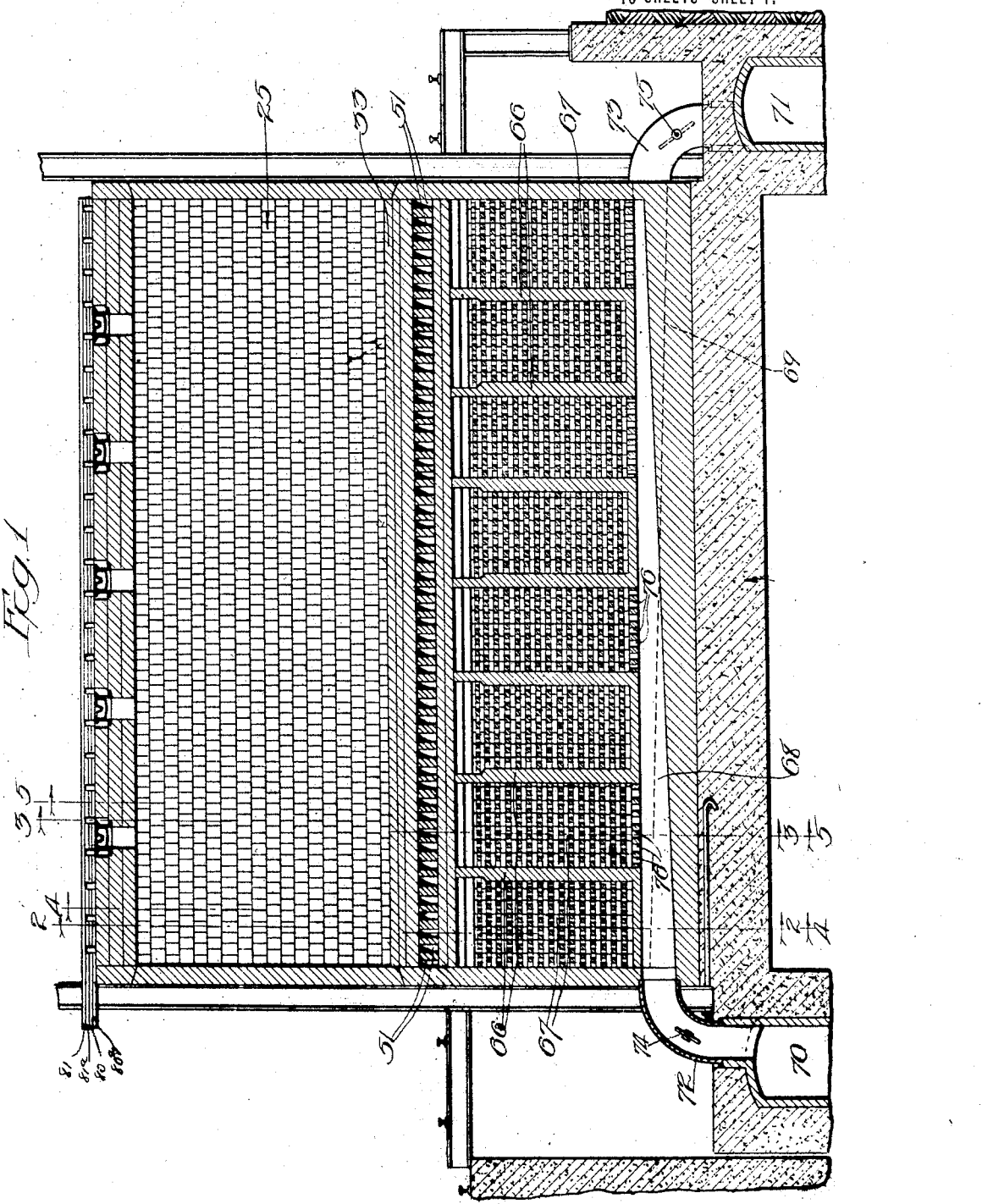

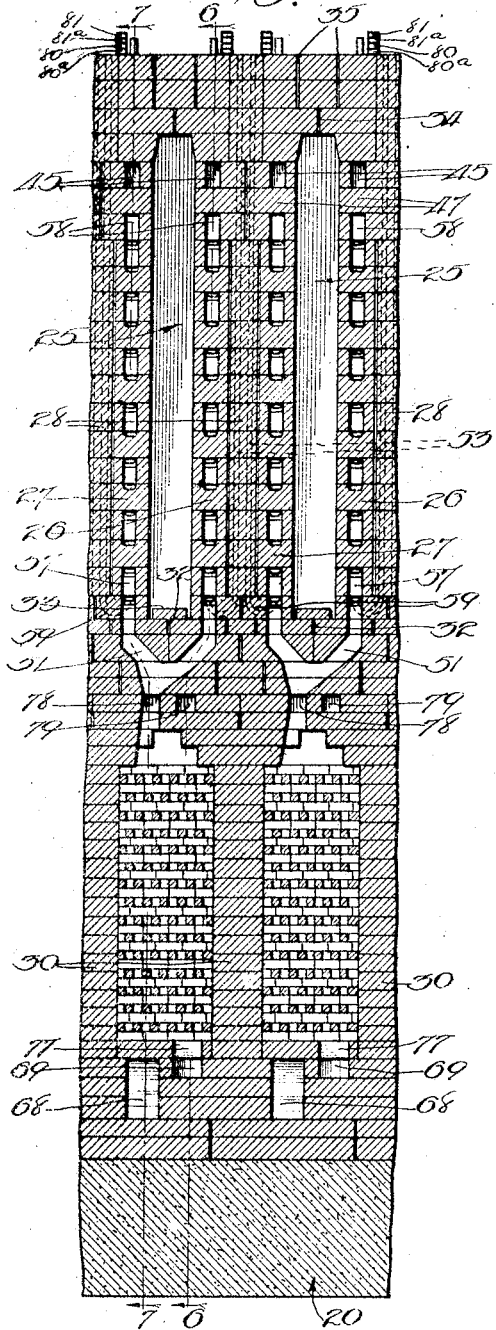
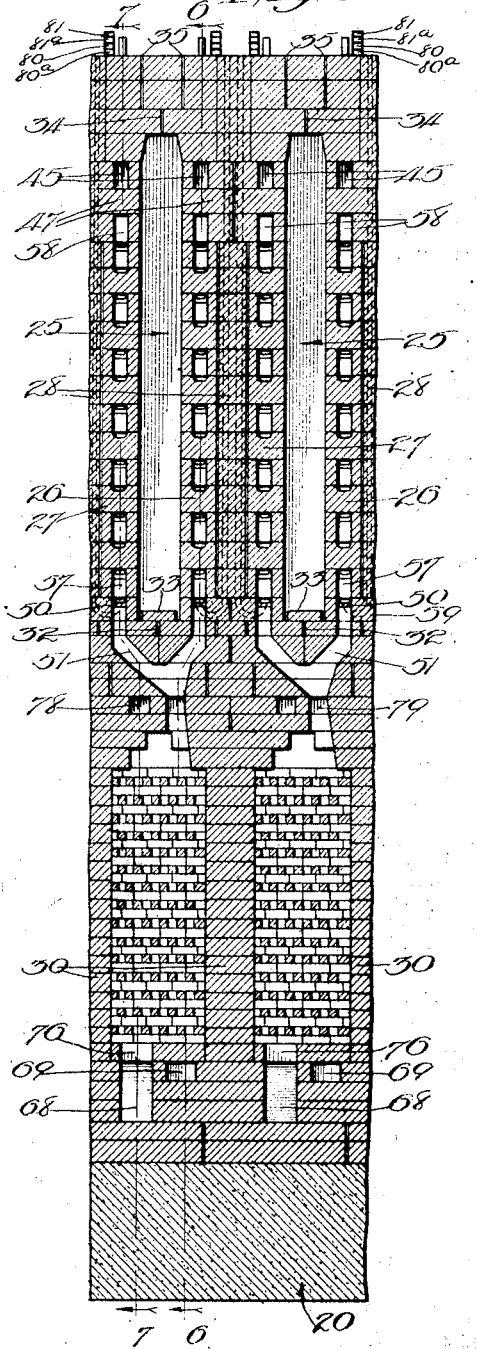

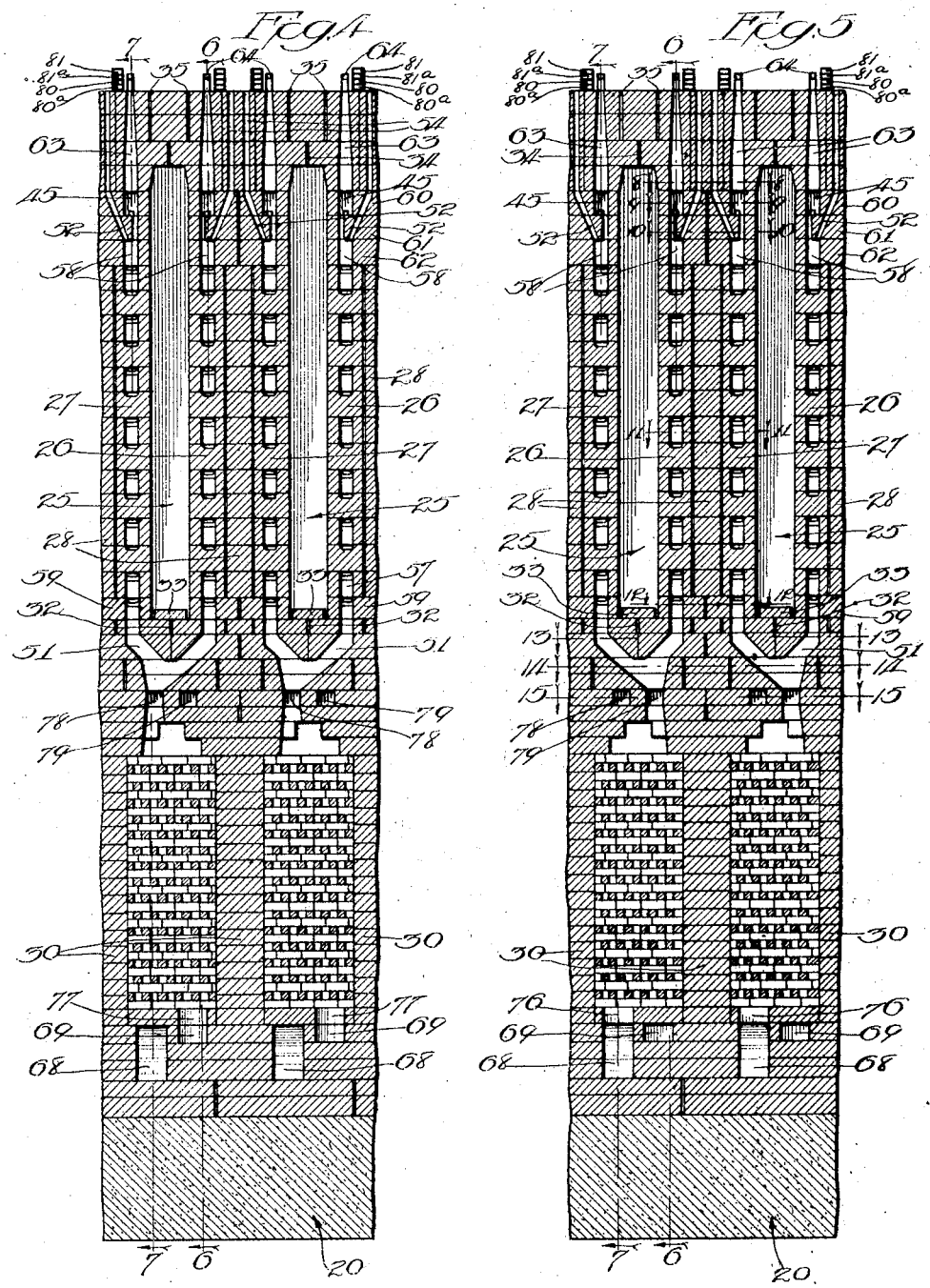

1,411,224.

Patented Mar. 28, 1922.
10 SHEETS—SHEET 4.

Fig. 6

Witness:
Harry S. Gaither

Inventor:
Arthur Roberts

A. ROBERTS.
COKE OVEN.
APPLICATION FILED SEPT. 8, 1919.

1,411,224.

Patented Mar. 28, 1922.
10 SHEETS—SHEET 5.

Witness:
Harry S. Gaither

Inventor:
Arthur Roberts

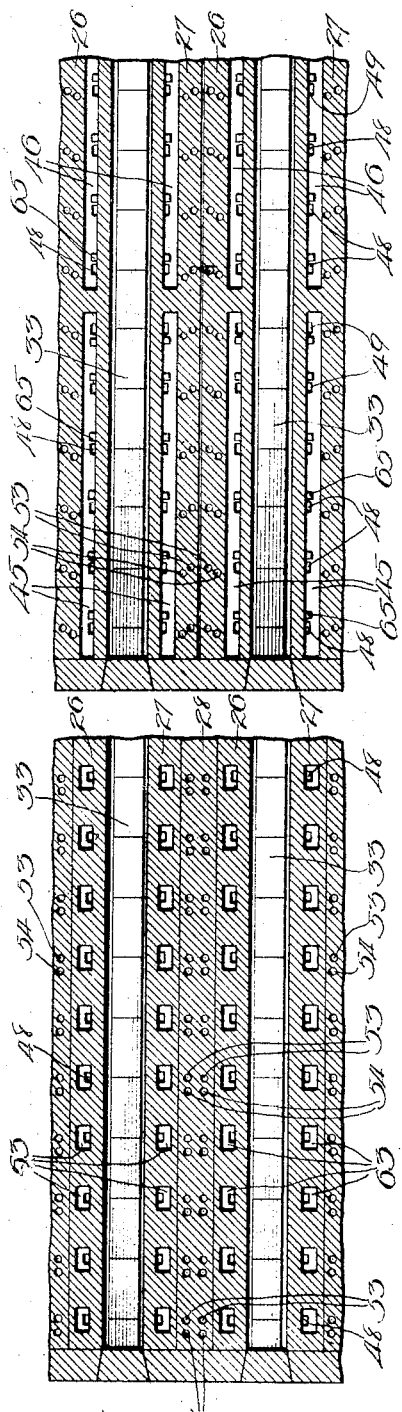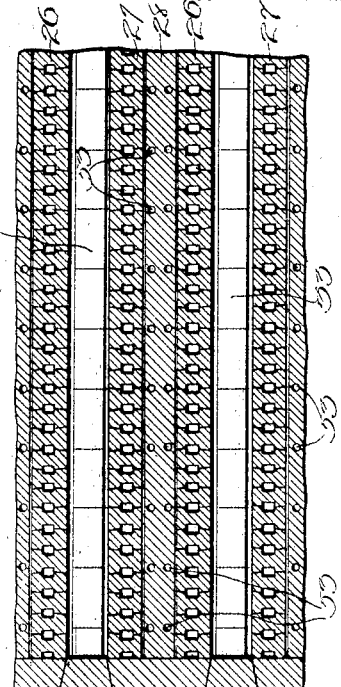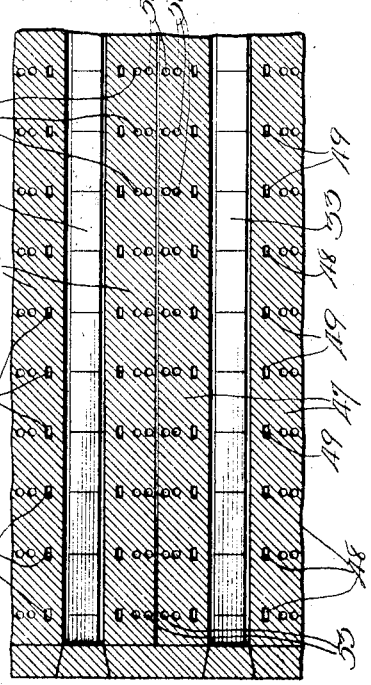

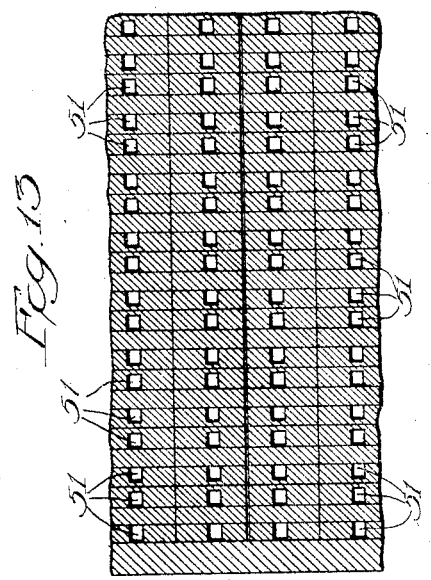
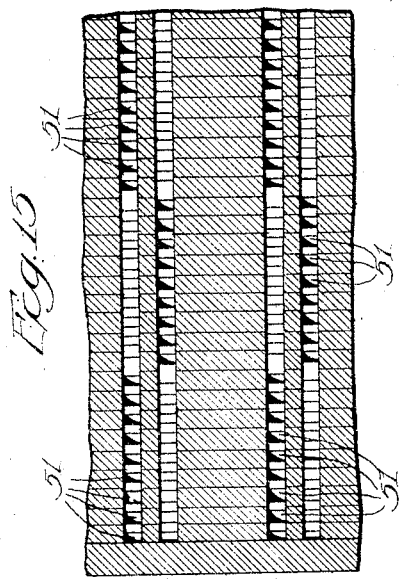
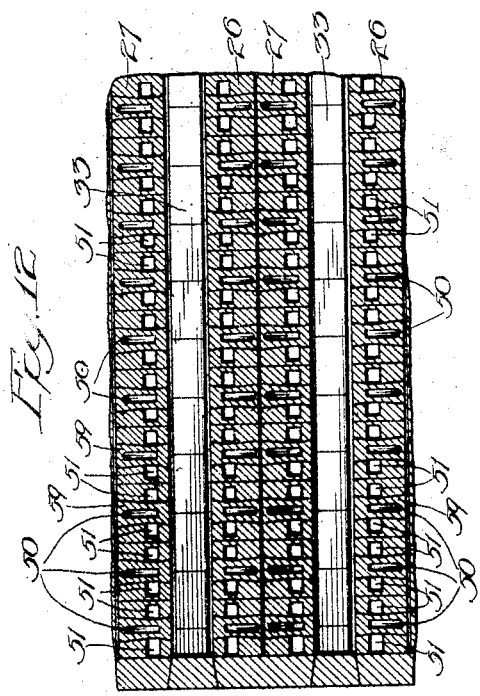
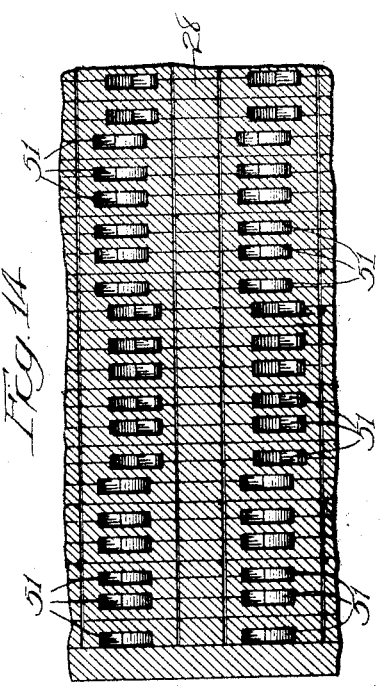

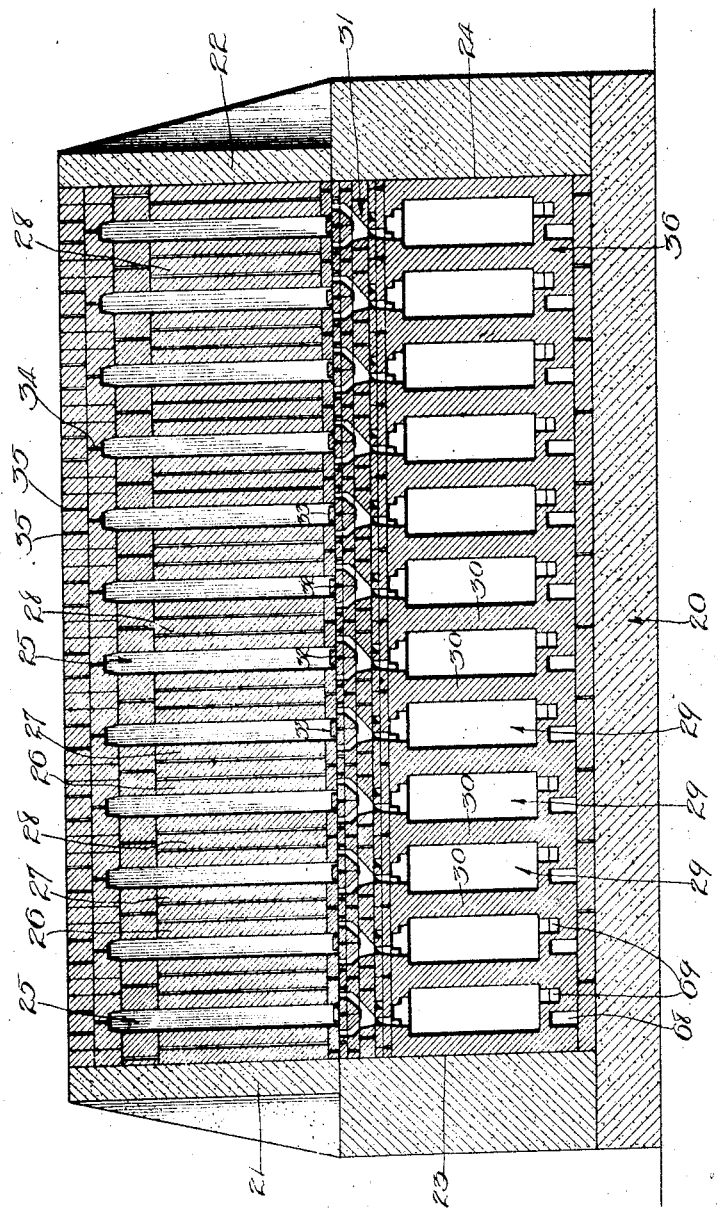

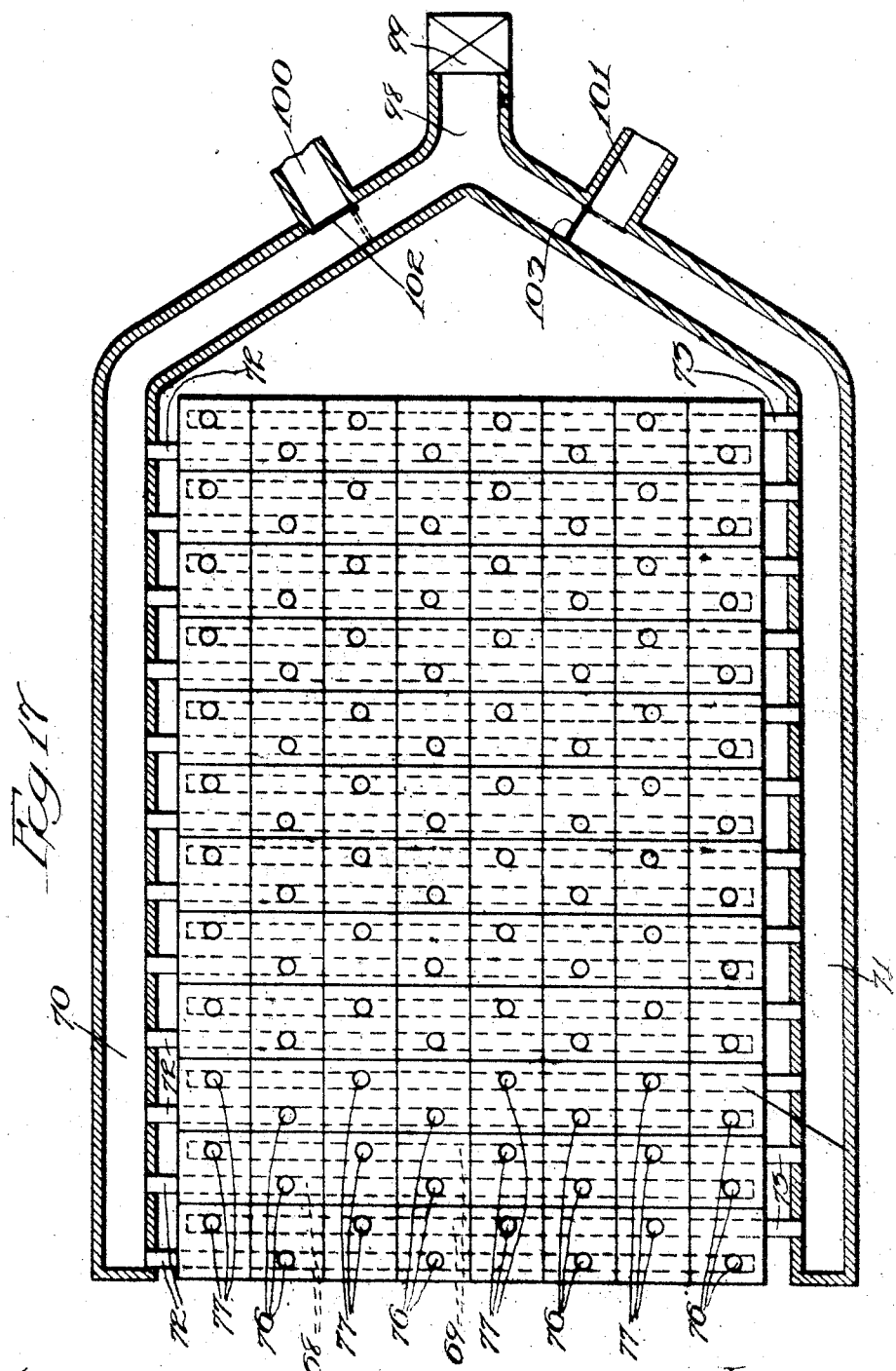

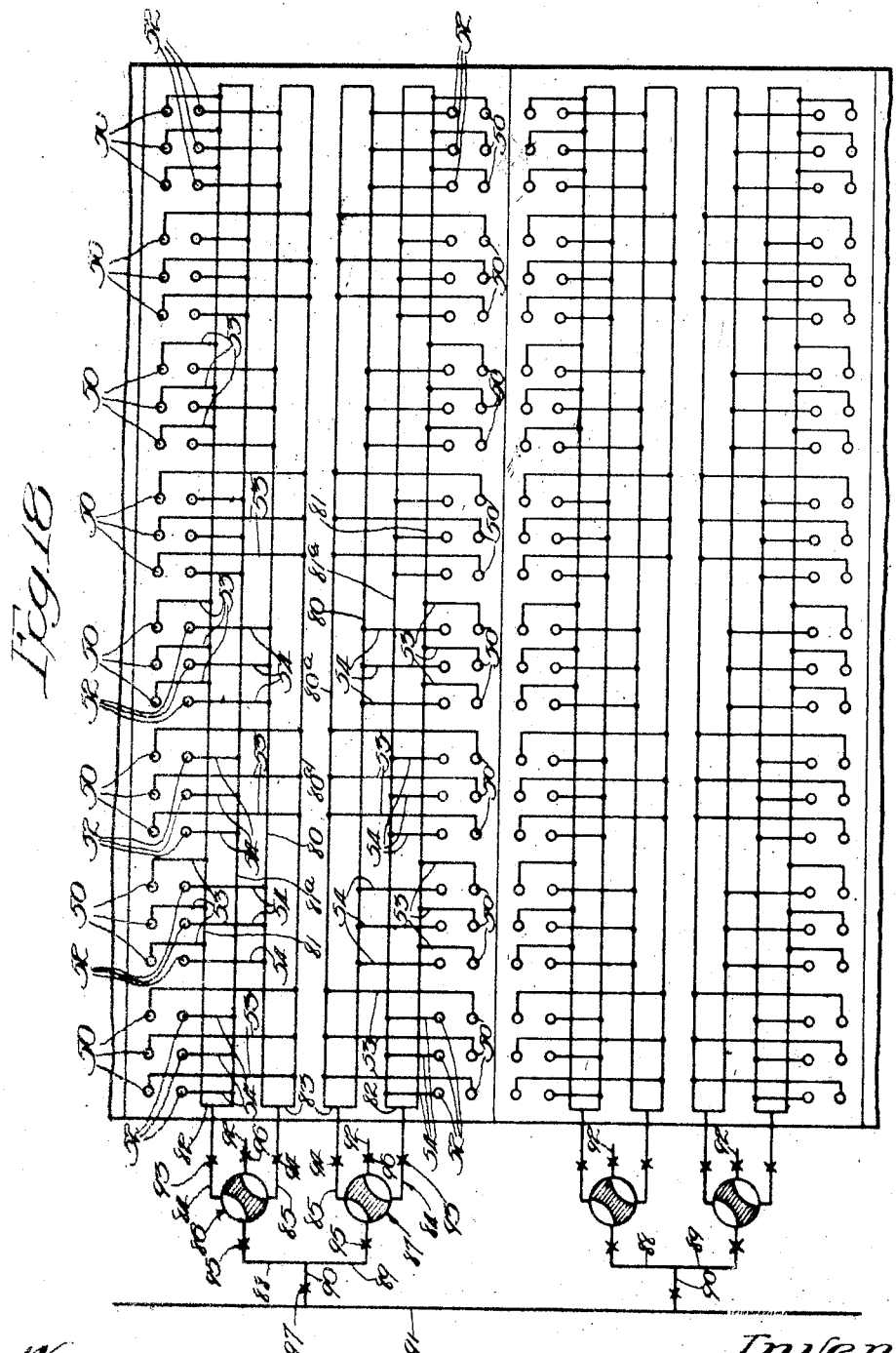

UNITED STATES PATENT OFFICE.

ARTHUR ROBERTS, OF EVANSTON, ILLINOIS, ASSIGNOR, BY MESNE ASSIGNMENTS, TO CHICAGO TRUST COMPANY, TRUSTEE, OF CHICAGO, ILLINOIS, A CORPORATION.

COKE OVEN.

1,411,224.  Specification of Letters Patent.  Patented Mar. 28, 1922.

Application filed September 8, 1919. Serial No. 322,413.

*To all whom it may concern:*

Be it known that I, ARTHUR ROBERTS, a citizen of the United States, residing at Evanston, in the county of Cook and State of Illinois, have invented certain new and useful Improvements in Coke Ovens and the like, of which the following is a specification.

The present invention has to do with improvements in coke ovens and retorts generally which are used for the distillation of coal and other materials. While the structures herein disclosed are particularly well adapted for use in the distillation of coal, and other carbonaceous material, for the formation of coke, still the said structures may also be used for other purposes to great advantage. Therefore, where, in the specification and claims, I use the expression "coke oven" or like expression, it will be understood that I do not limit myself to the invention as far as its use for various purposes is concerned, but rather that the said expressions are used for convenience in designating the structure itself regardless of the purpose for which it is to be used.

I will state at this point, however, that in the destructive distillation of coal, and other carbonaceous materials, for the formation of coke, it is necessary to so conduct the distillation process as to bring about the formation of the desired end products. Ordinarily these end products are coke and by-products. In those cases in which the coke is the end product chiefly desired, the heat action should be such as to so cement the particles of fixed carbon and other residuum together as to form the coke structure; whereas in those cases in which the by-products are the end products chiefly desired, the heat treatment should be so conducted as to bring about the formation of a maximum yield of said end products. In some cases it is desired to secure the coke with a maximum yield of by-products in which case the heat treatment should, if possible, be such as to bring about the formation of both of these classes of products.

It may be stated in general that, in order to secure the most desirable results either in the form of coke or by-products, the oven or retort should be so constructed that it may be heated throughout its entire surface in a practically uniform manner; and should also be so constructed that its temperature at different points may be readily controlled so as to secure such uniformity and so as to form the desired end products. One of the main objects of the present invention is to provide a construction of oven such that practically the entire surface thereof can be uniformly heated at all times and at every point under the direct control of the operator.

Another feature of the invention has reference to the recovery of a large percentage or proportion of the waste heat from the spent gases; this feature of the invention has reference to the provision of regenerators or the like in combination with the various retorts or heating walls of retorts of the bench of ovens in such way that the operation of the entire bench can be, if desired, individualized, each oven in such case operating in conjunction with its own regenerator or the like as a unit, notwithstanding the fact that said complete unit constitutes a portion of a larger bench comprising a number of units. In this connection, another feature of the invention has reference to the provision of a construction such that the regenerators or the like for each oven shall be very directly associated therewith. This will shorten up the passages between the heating walls and regenerators or other heat conserving devices, and will also make possible a very compact structure.

Another feature in this connection is the provision of an arrangement such that the regenerators and heating walls for each oven, together with their burners and the gas and air controlling devices, may be fully unitized, or brought into such relationship that these devices for each oven will constitute a complete unit capable of operation independently of the other ovens; nevertheless to so construct and arrange these parts that they will be properly interrelated or knit together in the complete structure of a bench of ovens. Another feature of the invention has reference to the provision of a new and desirable arrangement for securing a uniform heating action in each heating wall. As the heating gases travel through the passages of the wall, they give up their heat to the wall and their temperature is correspondingly lowered. It is, therefore, evident that if a uniform heating action is to be secured over the entire area or face of the wall, it will be necessary to make special provision for compensating or making up for this reduction of temperature of the heating gases. One of the features of the present invention has reference to the provision of means for reinforcing the combustion at a successive point or points within the wall to thereby raise the temperature of the gases after they have performed a certain amount of work, so that the heating action will be correspondingly reinforced and the heating effect made more nearly uniform at all points. In this connection another object is to make possible the securing of this result in a construction such that the heating gases will not have to travel an excessive distance in their course through the heating wall. Another object in this connection also is to associate the foregoing arrangement with a regenerator structure in such a manner that a practically uniform or continuous heating action may be brought about at all times. Still another object in this connection is to provide the foregoing arrangement and secure the foregoing result in a structure in which the regenerators are unitized with respect to their ovens and the heating walls thereof.

Still another feature of the invention has to do with the provision of an arrangement such that the operation of the burners at different points within the wall can be very easily and conveniently adjusted or regulated from time to time without interfering with the normal and regular operation of the oven.

Another feature of the invention has to do with the provision of a construction such that the natural expansion of the ovens lengthwise of the bench can be taken care of without detriment to the structure itself, and with the assurance that the gas and air passages will at all times remain in tight and first-class condition. In this connection it should be remembered that structures of this kind are subject to a wide range of temperatures from the time that the bench is first constructed until it is brought into normal and regular operation. Furthermore, the material most frequently used, silica brick or blocks, has a relatively large coefficient of expansion, so that within a bench comprising twenty or forty ovens there will be a large overall expansion. In the ordinary construction, the ovens are so related to each other that the expansion in the various ovens is cumulative, so that the total expansion at one or both ends of the bench is large and becomes a serious factor to contend with. For example, if the expansion within each oven amounts to one-half inch, then in a bench of forty ovens, the total expansion would amount to twenty inches, and in the ordinary type of construction this total amount of expansion would have to be compensated for in the end ovens. One feature of the present invention has to do with a relative arrangement of the ovens such that the expansion in each oven is provided for locally and such that the original overall dimension of the bench is approximately sufficient to provide for substantially the total amount of expansion without the movement of the walls themselves.

Other objects and uses of the invention are to generally improve and advance the construction and operation of distillation retorts and particularly such retorts as are used in the carbonizing of coal and other carbonaceous materials.

In the drawings:

Figure 1 shows a longitudinal vertical section through one of the ovens of a bench of coke ovens embodying the features of the present invention;

Fig. 2 shows a typical cross section taken on the line 2—2 of Fig. 1, looking in the direction of the arrows. It may also be considered a section taken on the lines 2—2 of Figs. 6 and 7, looking in the direction of the arrows;

Fig. 3 is a view similar to Fig. 2, with the exception that it is taken on the line 3—3 of Fig. 1, looking in the direction of the arrows. It may also be considered as a section taken on the lines 3—3 of Figs. 6 and 7, looking in the direction of the arrows;

Fig. 4 is a typical section taken on the line 4—4 of Fig. 1, looking in the direction of the arrows. It may also be considered as a section taken on the lines 4—4 of Figs. 6 and 7, looking in the direction of the arrows;

Fig. 5 is a typical section taken on the line 5—5 of Fig. 1, looking in the direction of the arrows. It may also be considered as a section taken on the lines 5—5 of Figs. 6 and 7, looking the direction of the arrows;

Fig. 6 is a section taken on the line 6—6 of Figs. 2, 3, 4, and 5, looking in the direction of the arrows;

Figure 7:
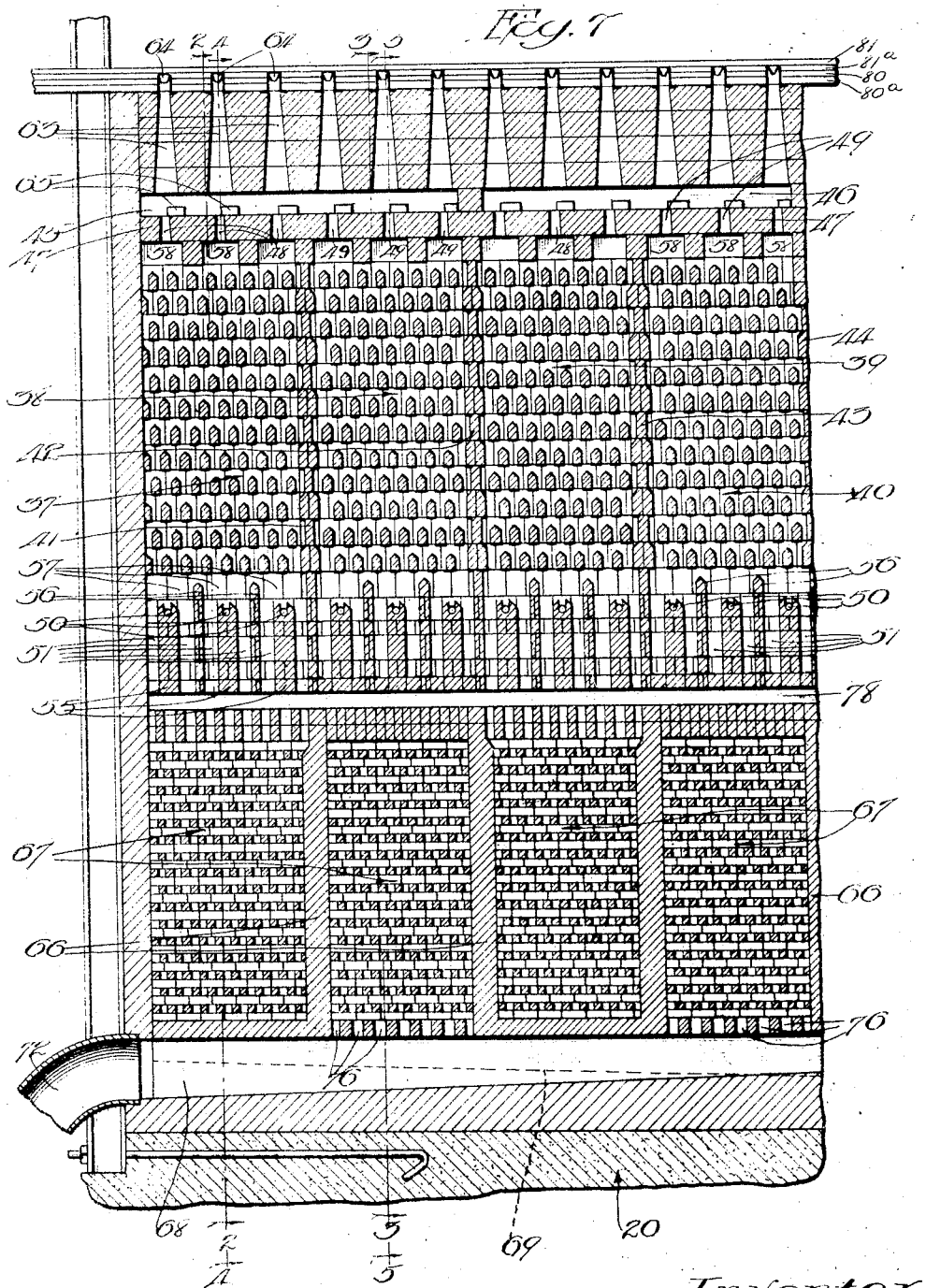
Fig. 7 is a section taken on the lines 7—7 of Figs. 2, 3, 4, and 5, looking in the direction of the arrows.

Figs. 8, 9, 10, 11, 12, 13, 14, and 15 are horizontal sections taken on the lines 8—8, 9—9, 10—10, 11—11, 12—12, 13—13, 14—14, and 15—15, respectively, of Fig. 5, looking in the direction of the arrows;

Fig. 16 is a typical longitudinal section of the entire bench of coke ovens embodying the features of the present invention, showing the manner in which provision has been made for permitting the proper amount of relative expansion to take place between consecutive ovens in order to ensure that the overall expansion shall not be cumulative in the end ovens;

Fig. 17 is a typical plan view of a bench of ovens, showing a simple arrangement of dampers for controlling the flow of air and spent gas; and Fig. 18 is a typical plan view of a piping arrangement for controlling the flow of gas to the various primary and secondary burners so as to secure the proper reinforcement of combustion during the reversals of the operation of the regenerators.

In the construction illustrated in the drawings, a number of ovens each embodying the features of the present invention are shown as they may be related or brought together into a common structure or bench of ovens where their operations are more or less coordinated, although at times it may be desired to operate each oven or a number of ovens quite independently of the others. In this construction as illustrated, the entire bench of ovens is mounted or carried on a mat or foundation 20. This mat will ordinarily be of reinforced concrete or any other structure of suitable strength and materials for the work intended. Adjacent to the end portions of this mat are end walls 21 and 22. The distance between the inner surfaces 23 and 24 of these end walls is approximately unchangeable, inasmuch as the mat itself operates at practically normal temperatures, and is subject to very little expansion and contraction.

A number of ovens are illustrated in Fig. 16 each one provided with a retort or carbonizing chamber 25. Although it happens that twelve ovens are illustrated, the number of ovens may be greater or smaller as desired. Each of the ovens illustrated in Fig. 16 has a pair of heating walls 26 and 27, which, in said illustrated construction, are independent of the heating walls of the other ovens. In the construction illustrated in that figure, there is also provided a blank wall or partition wall 28 between the heating walls of two adjacent or consecutive ovens, but, in many cases the use of such intermediate or partition wall may be dispensed with.

Beneath each oven is a regenerator chamber 29, or a series of said chambers, for the particular oven in question. These chambers are carried in the foundation or lower portion of the structure as a matter of convenience. It is also to be observed that in the arrangement of Fig. 16, the walls 30 between the consecutive regenerator chambers are located beneath the heating partition walls of their respective ovens, so that the loads of said walls are transmitted directly to the mat through the medium of said walls 30. The construction presently to be described is also such that the loads within the carbonizing chambers are transmitted to the walls 30 in a very direct manner and without the possibility of rupture or distortion of the parts except in very extreme cases. This is done by means of an intermediate section or structure 31 located between the carbonizing chambers or retorts and the foundation or regenerator structure. This intermediate section 31 also provides certain passages for the transfer of air and gas between the heating walls and the regenerator or foundation structure.

It is to be observed at this point that when the temperature of the structure is raised, when the bench is brought into operation, there will be a very considerable expansion in the direction of the end walls 21 and 22, so that, under ordinary circumstances, if said end walls were to be located a fixed distance apart, the expansive force would rupture the foundation structure or the end wall, or else would throw portions of the structure out of alignment. It has, therefore, been the custom when a bench of ovens was first erected to set the end walls, or at any rate the end portions of the structure a sufficient distance apart to accommodate the probable maximum amount of overall expansion, on the theory or assumption that, as the expansion took place in different portions of the bench, it would cumulate and finally be delivered as a total amount at the end walls, necessitating a bodily movement of the end portions of the structure towards or against said end walls. Inasmuch as structures of this kind are necessarily built out of a large number of blocks or bricks held together by a more or less imperfect cementing action, it follows that by the time such structure was raised to the normal operating temperature, it was very much out of line and badly broken up in some portions. In fact the bodily shifting of some portions of the structure was ordinarily sufficient to throw some of the air and gas passages entirely out of registry with each other.

In the present case I have made provision for permitting a slight amount of movement or adjustment within or adjacent to each oven itself to compensate for the probable full amount of expansion which will occur therein, so that the end walls 21 and 22 may initially be set at the exact distance apart corresponding to the initial overall dimension of the structure, so that the expansion taking place in the ovens will be independently taken up in the various ovens, instead of cumulatively in the end ovens. For this purpose, I have provided a longitudinal crack or opening 32 in the sole of each oven of sufficient width to take up the probable full amount of expansion in said oven, and in order to prevent the entrance of coke, coal, etc. into said opening, I have provided a false bottom or protector 33 which is laid on the bottom or sole of the oven or retort, and covers over the crack 32 thereof, while permitting the expansion to take place unhindered. I have also provided other expansion joints 34 and 35 in the various courses of the roof portion of the structure, so that the expansion occurring therein may also be taken up locally at each oven.

It is to be observed at this point that ordinarily the intermediate section 31 will comprise a number of courses of bricks or blocks (there being six such courses in the construction shown in Fig. 16), and the expansion joints 31 are interwoven in the different courses so as to permit the various courses to adjust themselves locally at different points adjacent to their ovens without cumulation. I will also observe at this point that where expansion joints are provided in a number of courses as shown both in the intermediate section 31 and in the roofs or domes, the expansion joints in the various courses should be so related that gases cannot work their way through them, the expansion joints breaking joints with each other in the different courses. It is also observed in this connection that various planes of shear are thus established, each plane of shear lying between two courses within which there are expansion joints. If necessary, expansion joints may be provided in the foundation section 36, although ordinarily the rise of temperature in this portion of the structure will not be sufficiently high to necessitate this special precaution. I will also state that ordinarily the only portions which are subject to excessive expansion are those which are built up from silica brick or the like, and these are the portions within which special precautions should be taken for compensating for expansion. Ordinarily the only portions of the structure built from silica brick are the heating walls such as the walls 26 and 27 of each oven.

In a bench of ovens embodying this expansion feature, the end walls 21 and 22 will be located a fixed distance apart, and ordinarily will be anchored against any appreciable movement, and the oven structures will be built with proper spaces or joints to accommodate the probable amount of expansion in the raising of the temperature up to the working point, so that said joints will take up the expansion locally and without cumulation, and said joints will ordinarily be broken or so related in different portions of the structure that leakage or wastage of gases and air will be reduced to a minimum.

When a bench of ovens is constructed as outlined above, it may be raised to the normal working temperature of the structure without any appreciable distortion or disturbance in the joints and various portions of the structure, so that when it reaches the working temperature its walls and various passages will be tight and in perfect condition for the normal operation of the structure.

I will now explain more in detail the particular construction of the coke ovens disclosed herein, having particular reference to the manner in which they are heated, and the manner in which the temperature is controlled, heat conserved, and uniform heating effect produced. I wish to state at this point, however, that as far as the previously explained expansion feature is concerned, the same may or may not be used in conjunction with the particular type of coke oven structure now to be explained, and conversely said expansion feature may also be used in coke oven structures of many different forms and arrangement other than the particular one now to be explained.

The expansion feature and particular novel construction are, therefore, quite independent of each other in many respects, although, in many cases, it will be found to the mutual advantage of both features to incorporate them in a common structure.

Bearing all of the foregoing in mind, I will state that the particular type of heating walls herein disclosed are built up on the notched block principle disclosed and claimed in Letters Patent of the United States No. 1,132,685, issued to me March 23, 1915. I have illustrated the heating walls in the present case as being built up from such notched blocks largely as a matter of convenience in illustration and description, and while for some purposes special advantages will accrue from the use of the notched block principle in conjunction with the features of the present invention, still for other purposes it is not necessary to use the notched block construction in ovens constructed according to the present invention, and, therefore, I do not limit myself to such use except as I may do so in the claims.

Each of the heating walls is constructed from notched blocks as is clearly evident from an examination of Fig. 11, the blocks being centrally recessed so that when they are set together their recesses co-operate to produce a meshwork of interconnected passages on the interior portion of each heating wall, as is clearly evident from Figs. 6 and 7.

Figs. 6 and 7 each show approximately one-half the total length of the oven wall of the particular construction illustrated. It will be observed that in the length of such half wall, there are provided four sections or portions numbered 37, 38, 39, and 40, the passages in each of these sections being isolated from the passages in the other sections by vertical partitions 41, 42 and 43, the additional partition 44 being located in the center of the wall. While it is true that in the illustrated construction each of these sections is provided with a meshwork of interconnected passages formed by the notched block construction, nevertheless as far as certain features of the invention are concerned any other suitable form of passages might be used such, for example, as flues or the like. The zigzag passages, however, ensure an improved heat abstraction and a correspondingly better and more uniform heating effect.

The various sections 37, 38, 39, and 40 are to be considered in pairs, the sections 37 and 38 comprising one pair and the sections 39 and 40 another pair. Above these pairs of passages or groups of passages are located the horizontal headers or flues 45 and 46. The horizontal partition 47 to some extent separates or isolates the flues or passages 45 and 46 from their passages or groups of passages 37, 38, 39, and 40. Within the partition 47 is an opening or series of openings 48, and an opening or series of openings 49. The opening or openings 48 establish communication between the passage or group of passages 37 and the corresponding flue, and the opening or openings 49 establish communication between the passage or group of passages 38 or 40 and the corresponding flue 45 or 46. It is thus evident that gases rising through one of the sections 37 or 38 will be transferred to the flue 45 and may then pass downwardly through the passage or section 38; and it is evident that a similar action may occur as between the sections 39 and 40.

Located in the lower portion of each of the sections 37, 38, 39, and 40 is a series of burners 50 through which combustion gas is admitted to mix with air, so that the gases rising through the corresponding section will be in combustion and generating heat. This air for combustion rises through passages 51 adjacent to the burners, being delivered to said passages 51 from any suitable source, but preferably from suitably located regenerators or other preheating arrangements.

In those cases in which the total amount of gas and air for combustion are introduced through the burners 50 and through the passages 51, respectively, it will be evident that the hot products of combustion will rise through one section, be transferred laterally through the corresponding flue 45 or 46, and descend through the other section of the pair. In such case the total length of travel of the products of combustion will be substantially equal to the length of two sections plus approximately one-half the length of the corresponding flue. Since the sections 37, 38, 39, and 40 are relatively short, there being illustrated eight of them in the total length of the wall, it follows that the distance of travel of the heating gases would not be excessive. In any case, however, there would probably be an appreciable reduction of temperature by the time the heating gases were ready to leave the wall.

I have, therefore, provided an arrangement whereby it is possible to reinforce the combustion after the heating gases have given up a portion of their heat so that a much more uniform heating effect is produced over all portions of the wall surface. For this purpose, I have provided means for introducing an additional or supplemental portion of combustible gases after the gases have traversed approximately one-half the total length of their travel through the sections 37, 38 or 39, 40, as the case may be. Ordinarily the procedure will be to introduce the full quantity of air through the passages 51, and only approximately one-half the gas for combustion through the burners 50, so that the air is in excess. Consequently when the gas so introduced has been fully consumed, there will still remain approximately 50% of the total amount of oxygen uncombined in the mixture and available for further combustion. I then provide means for introducing approximately the remaining 50% of the gas for combustion when the mixture starts down through the other side of the pair 37, 38 or 39, 40, as the case may be. This additional gas so introduced will combine with the uncombined oxygen, generating additional heat units, restoring the temperature to the desired point, and ensuring a much more uniform overall heating effect than would otherwise be secured.

This additional gas for combustion is introduced through passages or burners 52 best shown in Figs. 4 and 5, which passages or burners communicate directly with the upper portions of the sections 37, 38, 39 and 40.

It will be observed from an examination of Figs. 6 and 7 that burners such as 50, with the accompanying air passages, are located in the lower portion of each of the sections, and examination of Figs. 8, 9, and 10 reveals the presence of the supplemental gas burners 52 adjacent to the upper ends of each of the sections. It will be evident that, if the flow through the pair 37, 38 is upwards through the section 37 and downwards through the section 38, the only burners used are the burners 50 at the lower end of the section 37 and the burners 52 at the upper end of the section 38. Consequently during such operation the lower portion of the section 37 and the upper portion of the section 38 will necessarily be operating at a higher temperature than the upper portion of the section 37 and the lower portion of the section 38.

In order to ensure a perfectly equalized operation at all times, I have provided other burners 50 at the lower end of the section 38, and other burners 52 at the upper end of the section 37, so that, in the operation of the structure the burners may be reversed, the products of combustion rising through the section 38 and descending through the section 37. By alternating the operation from time to time, a practically uniform temperature will be secured at all portions of the structure with a remarkably even control of temperature all over the surface of a very large heating wall.

Means must be provided for delivering the gas for combustion to the burners 50 and 52, and for ensuring the operation of said burners in proper sequence. The gas ordinarily used for combustion is a portion of the distillation products from the ovens themselves, but under any circumstances the subjection of the gas to relatively high temperature will ordinarily cause a portion of said gases to split with corresponding deposition of carbon, and corresponding tendency to foul the passages. It is, therefore, desirable to provide an arrangement such that the gases will travel a minimum distance and will be raised a minimum amount in temperature, and also such that the provision of pockets or sharp bends in the passages will be to a large extent eliminated since the soot or other deposited carbon would naturally tend to cumulate in such places.

As a very simple arrangement for delivering the gases to the burners 50, I have availed myself of the presence of the intermediate or partition walls 28, having provided for this purpose the vertical gas passages or pipes 53 whose lower ends communicate with the burners 50. Ordinarily there will be a single passage or pipe 53 for each burner 50 so as to facilitate the control of gas to said burners. In like manner, the gas for the burners 52 is delivered through other vertical pipes or passages 54 located in the partition walls or above them. All of the passages or pipes 53 and 54 extend to the top of the structure where they can be most conveniently reached, and where the connections to them may be most easily effected and controlled. I will not at this point describe in detail said connections beyond stating that the connections are such that by a very simple operation it is possible to simultaneously deliver gas to all of the burners 50 of alternate sections, and to all of the burners 51 of the intermediate sections, and by another very simple operation to reverse the delivery of gases so that those burners 50 and those burners 51 which were previously idle will be brought into operation, the burners 50 and 51 previously used being shut off.

It will be observed that the burners 50 are provided in the nature of slits in the upper portions of short partitions or walls 55, intermediate which walls or partitions are other walls or partitions 56. The intermediate partitions 56 are carried somewhat above the burner slits 50 so as to provide combustion chambers 57 for the various burners, the air passages 51 rising at the sides of the burner slits and delivering air to both sides of each of said burners. By this arrangement a very perfect mixture of air and gas will be ensured from each of the burners 50, and consequently a maximum heating efficiency will be obtained from the very moment that the gases commence to rise through the heating sections.

It will also be observed that just beneath the partition 57 and the openings 48 and 49 therein are the enlarged combustion chambers 58 into which the gases descending through the openings 48 or 49 pass and into which the additional combustion gas from the burners 52 is initially delivered. These chambers 58, therefore, serve as combustion chambers to ensure a perfect mixture and combustion of the supplemental gas with the previously unconsumed oxygen of the mixture descending from the flue or passage 45 or 46.

Since the burner slits 50 are located in line with their respective heating walls whilst their gas passages or pipes 53 are located within the corresponding partition wall, it is necessary to effect a transfer of gas from the passages 53 to the burner slits. The construction whereby this is possible will be readily understood from an examination of Figs. 2 and 3. From these figures, it will be observed that the burner slits are located in specially formed blocks 59 which reach from their heating walls over into or beneath their partition walls on a line or plane of shear, each of the blocks 59 having a semi-circular passage through it, the inner end of which communicates with the lower end of the corresponding passage 53. By this arrangement the ability of the structure as a whole to adjust itself to accommodate the initial expansion is in no wise interfered with, and any slight readjustment taking place will not interfere with the proper registery of the passages 53 with their corresponding burner slits.

It will also be observed from an examination particularly of Fig. 8 that, in the extreme upper portion of the structure, all of the passages or pipes 53 and 54 are located centrally and in the upper extension of the intermediate or partition wall, whereas, as shown in Figs. 4 and 5, the burners 52 are within their respective heating walls, the pipes or passages 53 continuing downward through the partition walls to the burner 50. In order to secure this result in the most advantageous manner, I have provided three courses of blocks 60, 61 and 62, as best shown in Figs. 4 and 5, which overlap from the heating walls into the intermediate or partition walls on planes of shear, with spaces between their inner ends, if necessary, for the accommodation of expansion or adjustment in the heating of the structure. These courses of blocks are provided with diagonally arranged or slanting passages which transfer the supplemental gas from the passages 54 to the burners 52. In this connection, it is also observed from an examination of Figs. 8, 9, and 10, which are successive planes, that whilst the pipes or passages 54 were initially located in alignment with the pipes or passages 53 in a direction parallel to the walls, by the time said passages reach the burners 52, they have been swung around into a position such that they are parallel with the pipes or passages 53 measured in a plane extending transversely of the walls. This arrangement makes it possible to bring the upper ends of all of the pipes or passages 53 and 54 very close together on the upper surface of the bench of ovens, whilst bringing them into the desired relationship lower down and at the points where their burners are located.

Examination of Figs. 4, 5, 6, and 7 in particular reveals the presence of inspection ports or openings 63 located above the openings 48 and 49, and terminating at the top of the bench of ovens. These inspection openings or passages 63 may be provided with suitable windows or the like 64 either permanently closed or so constructed that they may be opened from time to time. It will also be observed that these inspection openings 63 taper in size from top to bottom so that rods or the like introduced through them may be swung so as to move their lower ends about with respect to the openings 48 and 49. Ordinarily adjustment blocks or the like 65 will be located in the passages 45 and 46 and adjacent to the openings 48 and 49, so that, by proper manipulation through the inspection openings 53, it will be possible to partially cover the openings 48 and 49 in order to regulate the draft or flow of gas through these openings individually.

The features of construction so far explained constitute oven constructions which may or may not be used in conjunction with heat recovering and conserving devices such as recuperators, regenerators, etc. Inasmuch, however, as the use of such devices is, in most cases, desirable not only from the standpoint of improvement in efficiency of operation, but also from the standpoint of securing a more equal and uniform operating temperature, I have herein disclosed the use of such features in conjunction with such heat conserving and recovering devices in the form of regenerators. I will also state at this point that the regenerator constructions herein disclosed are peculiarly related to the heating wall constructions in the sense that the flow of air and gases through the regenerators is definitely related to the reversals of gas in the burners and in the different passages.

Bearing all of the foregoing in mind, there are provided within the foundation or in the lower portion of the structure, a series of regenerator chambers or sets of chambers 29 corresponding to the individual ovens, and located between the partition walls 30. Each of these regenerator chambers or sets of chambers contains the necessary checkerwork or the like for abstracting and recovering the waste heat for a particular oven and heating walls thereof.

As shown particularly in Figs. 1, 6, and 7, there are a series of vertical partitions 66 subdividing the chambers 29 into relatively small regenerator chambers 67 corresponding in position and function with the heating wall sections 37, 38, 39, 40, etc. It is thus evident that for the corresponding heating wall sections of the two heating walls of each oven or retort there is a regenerator section 67.

Means and connections are provided whereby during one portion of the operating cycle air is delivered to and passes up through those regenerator sections corresponding to the heating wall sections into which the air is primarily delivered, and for ensuring at the same time a delivery of spent gas from the complementary heating wall sections to the intermediate regenerator sections. On the other half of the cycle, the operation is reversed, so that at the same time that the flow of air and gas is reversed through the heating wall sections, reversals take place in the regenerator sections. I will now describe the particular constructions illustrated in the drawings for ensuring the foregoing results.

In the sole of each oven is a series of U-shaped connections connecting with the lower portions of the heating passages in the two heating walls of the corresponding oven. In the construction illustrated these passages comprise the passages 51 of Figs. 6 and 7 whose lower ends are brought together in the manner clearly evidenced in Figs. 2, 3, 4, and 5. It is evident from each wall or regenerator section there are a number of these passages, this being evident from examination of Fig. 1 in particular.

A comparison of Figs. 2 and 3 which are sections taken in adjacent wall and regenerator sections, will show that the passages 51 for each wall section communicate directly with their respective regenerator sections. In this way the spent gases and air are respectively exchanged between the wall sections and the regenerator sections during the different portions of the operating cycle.

Beneath the regenerator sections of each oven is a pair of transversely extending passages 68 and 69, lying side by side, so that the passage 69 appears in dotted lines in Fig. 1, whereas the passage 68 is in full lines in said figure. A pair of tunnels 70 and 71 extend longitudinally of the bench of ovens and each of the passages 68 connects to the tunnel 70 by a connection 72, and each of the passages 69 connects to the tunnel 71 by a connection 73. Dampers 74 and 75 are placed in the connections 72 and 73 for the purpose of regulating the draft on said connections, so that the draft at each oven can be brought to the amount or degree desired according to the operation of that oven.

Considering again an individual oven and its regenerators, the passage 68 connects into the bottom portions of the alternate regenerator sections by means of connections 76; whereas the passage 69 connects into the bottom portions of the intermediate regenerator sections by means of the connections 77 as best shown in Fig. 6.

It will now be evident that upon removing the spent gas through the tunnel 70 and delivering air through the tunnel 71, we will be able to deliver air to each of the left-hand regenerator sections of the various pairs (viewing the structure as in Figs. 1, 6, and 7); whereas spent gas will be simultaneously withdrawn from the right-hand regenerator sections of each pair when viewing the structure in the same manner. Therefore, upon introducing air through the tunnel 71 and gas through the burners of the left-hand wall sections of each pair at the bottom, and at the top of each right-hand wall section of each pair, a correct operation will be secured, the incoming air being heated by the previously heated regenerator sections and the outgoing spent gas serving to simultaneously heat the cool regenerator sections. After the lapse of the proper time interval the operation will be reversed in the manner which will be readily apparent from the disclosure thus far given. Examination of Figs. 1, 6 and 7 in particular will show that the passages 68 and 69 taper in cross section, this arrangement being adopted because the volume of gas in said passages varies according to the position throughout its length.

Examination particularly of Figs. 2, 3, 4, and 5 and Fig. 15 will shown that beneath each oven is a pair of transversely extending passages 78 and 79. The passages 78 communicate with the U-shape connections 51 of the alternate wall sections, and the passages 79 communicate with the U-shape connections 51 of the intermediate wall sections. This arrangement is facilitated by the construction best illustrated in Figs. 2, 3, 4 and 5 in which it will be noticed that the connections 51 draw first towards one side and then towards the other side of the oven.

Above each heating wall are located four gas pipes 80, 80ª, 81 and 81ª, as is clearly evident from Figs. 1, 2, 3, 4, 5, 6, and 7. Fig. 18 shows diagrammatically the manner in which the various pipes are connected with respect to the various burners and with respect to each other. In this figure, the lowermost burners in each wall are shown diagrammatically by the circles, some of which are numbered 50, and the upper burners are shown diagrammatically by other circles, some of which are numbered 52. It will be observed that the ends of the two pipes 81 and 81ª are connected together by an end connection 82, the ends of the pipes 80 and 80ª being connected together by an end connection 83. Consequently the delivery of gas to either of said end connections will result in supplying the gas simultaneously to both of the corresponding pipes.

It will also be observed that the pipes or passages 53 for alternate groups of lower burners 50 are connected to the pipe 81; that the pipes or passages 53 for the intermediate groups of lower burners 50 are connected to the pipe 80ª; that the pipes or passages 54 for alternate groups of upper burners 52 are connected to the pipe 81ª, and that the pipes or passages 54 for the intermediate groups of upper burners 52 are connected to the pipe 80. The arrangement is such that when gas is delivered to the end connection 82 it finds its way through the pipes 81 and 81ª to the lower burners 50 of one-half of each group and to the upper burners 52 of the upper half of the other side of each group; and so that upon shutting off the gas from the end connection 82 and delivering it to the end connection 83 the gas will be delivered to the previously unused lower burners of each group and to the previously unused upper burners of said group. In order, therefore, to ensure a correct delivery of gas simultaneously to all of the burners, it is only necessary to periodically reverse the delivery to the end connections 82 and 83.

This periodical reversal is accomplished in the particular arrangement illustrated by means of the valves 86 and 87 for the companion heating walls of each oven. The end connections 82 and 83 are for this purpose connected to the opposite points of their respective valves by the connections 84 and 85. The gas connections 88 and 89 for the two valves 86 and 87 of heating walls of a particular oven are supplied through a connection 90 from the gas main 91. Upon simultaneously turning the plugs of the two valves 86 and 87 a quarter revolution, the supply of gas will be reversed for the burners of each heating wall in the manner previously explained.

It was previously mentioned that carbon or soot may occasionally be deposited in the pipes connected with the various burners and particularly the pipes 53 which reach down to the lower burners 59. Inasmuch as the walls containing these pipes will operate at a high temperature during the normal operation of the oven, it follows that upon introducing air through the connections the carbon will be burned out without the necessity of mechanically removing it. I, therefore, have illustrated an air supply pipe 92 in conjunction with each of the valves 86 and 87 and opposite to the corresponding gas supply pipe, so that when each to the control valves 86 and 87 is turned into position to supply gas to one set of lower burners and the corresponding set of upper burners of each group, air may be simultaneously delivered to the unused upper and lower burners, respectively. In this way the process or operation of burning out carbon may be carried on simultaneously with the normal operation of the oven and without the necessity of shutting down or interrupting the oven operations.

For the purpose of being able to isolate some of the gas pipes from the control valves, I have illustrated the valves 93 and 94 in the connections 84 and 85, respectively; and the valves 95 in the connections 88 and 89 respectively. Since it is only necessary to burn out the carbon occasionally and will ordinarily be unnecessary to burn it out at each periodical reversal of operation, I have illustrated the valves 96 in the air connections 92, by closing which valves it is possible to prevent the introduction of air with the successive reversals of the control valves. Occasionally when it is desired to burn out the carbon, the valves 96 may be opened, and while open the burning out process will proceed automatically with the reversals of the control valves. A valve 97 in each of the connections 90 provides a convenient means for cutting off the supply of gas to both of the heating walls of an oven.

Referring to Fig. 17 which shows diagrammatically the connections of the tunnels 70 and 71, it will be observed that these tunnels lead into a common connection 98 which, in turn, passes to a stack 99, or other draft producing arrangement. Air connections 100 and 101 lead into tunnel connections for the tunnels 70 and 71, respectively, and the dampers 102 and 103 are provided for placing the tunnels in connection either with the draft producing device or the air connections, as desired. In the position shown in Fig. 17, the spent gas is being withdrawn from the tunnel 70, and air is being introduced through the connection 101 and the tunnel 71. The dampers 102 and 103 should be reversed simultaneously with the operations of the gas control valves 86 and 87.

While I have herein shown and described only a single embodiment of the features of the present invention, still it will be understood that I do not limit myself to the said embodiment except as I may do so in the claims.

I claim:

1. In a retort coke oven, the combination of a pair of heating walls, each of said walls comprising notched blocks suitably related to provide on the interior of the wall a meshwork of interconnected gas passages, vertical partitions within each wall dividing the passages of said wall into a series of vertically extending zones, a horizontal passage above the upper ends of the passages of each pair of zones, the said horizontal passages being isolated from each other, openings between each said horizontal passage and both of the corresponding zones, inspection ports in alignment with said openings, dampers for said openings operable through said inspection ports, gas nozzles communicating with the lower portions of the passages of each zone, a regenerator corresponding to each zone, a pair of passages adjacent to the regenerators, connections from one of said passages to alternate regenerators, connections from the other of said passages to the intermediate regenerators, connections from one of said channels to the alternate regenerators, connections from the other of said channels to the intermediate regenerators, connections from one of said channels to the lower portions of the passages of alternate zones adjacent to the gas nozzles thereof, connections from the other of said channels to the passages of the intermediate zones adjacent to the gas nozzles thereof, means for admitting combustible gas to the nozzles of the alternate zones, and means for correspondingly admitting air or withdrawing spent gas from the proper passages, substantially as described.

2. A bench of retort coke ovens comprising a pair of vertical heating walls for each oven, a partition wall between the adjacent heating walls of adjoining ovens, a plurality of sets of U-shaped passages extending upwardly and across and downwardly in each heating wall, connections for delivering gas to the lower ends of the arms of each said set, a connection for delivering gas to the upper portions of the arms of each said set, passages between the heating walls and in communication with all of said connections, and means for controlling the delivery of gas through said passages, substantially as described.

3. A bench of retort coke ovens comprising a pair of heating walls for each oven, a partition wall between the adjacent heating walls of adjoining ovens, there being sets of U-shaped passages for heating gases in each heating wall, each said set comprising a pair of vertical arms and a cross top connection, connections for delivering gas independently to the upper and lower portions of each of said arms, and passages in the partition wall corresponding to said connections, substantially as described.

4. In a retort coke oven construction, a heating wall having on its interior a plurality of sets of U-shaped passages for heating gases, each said set including a pair of vertical arms and a cross connection within the wall, connections for delivering gas to the free end of each arm of each set, and connections for delivering gas to the arms adjacent to the cross connection, substantially as described.

5. A bench of retort coke ovens comprising a pair of vertical heating walls for each oven, a partition wall between the adjacent heating walls of adjoining ovens, each heating wall comprising blocks laid in courses and having on its interior a meshwork of interconnected passages, a series of nozzle blocks in the lower portion of each heating wall, each nozzle block extending throughout the thickness of the heating wall and into alignment with a portion of the partition wall, each nozzle block having an upwardly facing orifice for the delivery of gas into the heating wall and having a sidewise communicating passage extending to a point in alignment with the partition wall, and a passage in the partition wall in communication with each nozzle block passage, substantially as described.

6. A bench of retort coke ovens comprising a pair of vertical heating walls for each oven, a partition wall between the adjacent heating walls of adjoining ovens, each heating wall having on its interior a series of upwardly extending passages, a series of nozzle blocks in the lower portion of each heating wall, each nozzle block extending across the thickness of the heating wall to a point in alignment with the adjacent partition wall, and each nozzle block having an upwardly facing discharge orifice within the heating wall, and a sidewise communicating passage in conjunction with said orifice, said passage leading to a point in alignment with the adjacent partition wall, and a gas passage in the partition wall in communication with each of said sidewise extending passages of the nozzle blocks, substantially as described.

7. A bench of retort coke ovens including a series of vertical heating walls and adjacent partition walls of independent construction, each heating wall having on its interior a series of passages, a series of nozzle blocks in conjunction with said passages, each nozzle block extending throughout the thickness of the heating wall and to a point in alignment with the adjacent partition wall, there being a passage in each nozzle block having one end terminating for the discharge of gas into the heating wall and its other end in alignment with the partition wall, and passages in the partition wall in communication with the passages of the nozzle blocks, substantially as described.

8. A bench of retort coke ovens including a pair of heating walls for each oven, each heating wall comprising notched blocks suitably related to provide a meshwork of interconnected passages on the interior of the wall extending in zigzag fashion between its upper and lower portions, said heating walls being independent of each other and capable of independent expansion and contraction and adjustment with respect to each other, a series of nozzle blocks in the lower portion of each heating wall lying in horizontal alignment with each other and extending through the heating wall and into alignment with the partition wall and providing a plane of shear between the walls, each nozzle block having a longitudinal gas passage, and a series of gas passages within the partition wall communicating with the passages of said nozzle blocks, substantially as described.

9. In a retort coke oven a pair of heating walls enclosing a distillation chamber between them, each heating wall having on its interior an even number of vertically extending zones for heating gases, each zone being formed of notched blocks providing a meshwork of interconnected passages for the transfer of heating gases through said zone in a generally vertical direction, partitions between the passages of consecutive zones preventing the direct transfer of gases between the passages of such zones, a series of combustion chambers at the upper and lower ends of the passages of each zone, burners for delivering gas directly to the lower combustion chambers, there being passages for the admission of air at the sides of said burners and into said combustion chambers, there being passages for the delivery of combustible gas to the upper combustion chambers, a relatively short transfer flue above the upper combustion chambers of odd and even numbered zones, there being ports extending between said transfer flues and the combustion chambers beneath them, there being a vertical inspection port extending upwardly above each of said ports, a damper block for each of said ports operable through the corresponding inspection port, suitable means for controlling the admission of air and gas to the combustion chambers at the lower end of each zone of a pair of zones independently of the admission of air and gas to the combustion chambers at the lower end of the other zone of such pair, and suitable means for controlling the admission of gas to the combustion chambers at the upper end of each zone of a pair independently of the admission of gas to the combustion chambers at the upper end of the other zone of such pair, substantially as described.

10. In a retort coke oven a pair of heating walls enclosing a distillation chamber between them, each heating wall having on its interior an even number of vertically extending zones for heating gases, each zone being formed of notched blocks providing a mesh work of interconnected passages for the transfer of heating gases through said zone in a generally vertical direction, partitions between the passages of consecutive zones preventing the direct transfer of gas between the passages of such zones, a series of combustion chambers at the upper and lower ends of the passages of each zone, burners for delivering gas directly to the lower combustion chambers, there being passages for the admission of air into each combustion chamber, there being passages for the delivery of combustible gas to the upper combustion chambers, a relatively short transfer flue above the upper combustion chamber of odd and even numbered zones, there being ports extending between said transfer flues and the combustion chambers beneath them, suitable means for controlling the admission of air and gas to the combustion chambers at the lower end of each zone of a pair of zones independently of the admission of air and gas to the combustion chambers at the lower end of the other zone of such pair, and suitable means for controlling the admission of gas to the combustion chambers at the upper end of each zone of a pair of zones independently of the admission of gas to the combustion chambers at the upper end of the other zone of such pair, substantially as described.

11. In a retort coke oven a pair of heating walls, enclosing a distillation chamber between them, each heating wall having in its interior an even number of vertically extending zones for heating gases, each zone being formed of notched blocks providing a mesh work of interconnected passages for the transfer of heating gases through said zone in a generally vertical direction, partitions between the passages of consecutive zones preventing the direct transfer of gases between the passages of such zones, a series of combustion chambers at the upper and lower ends of the passages of each zone, there being passages for the delivery of combustible gas and air into the lower combustion chambers, there being passages for the delivery of combustible gas into the upper combustion chambers, a relatively short transfer flue above the combustion chambers of odd and even numbered zones, there being ports extending between said transfer flues and the combustion chambers beneath them, there being a vertical inspection port extending upwardly above each of said ports, a damper block for each of said ports operable through the corresponding inspection port, suitable means for controlling admission of air and gas to the combustion chambers at the lower end of each zone independently of the admission of air and gas to the combustion chambers at the lower end of the other zone of such pair, and suitable means for controlling the admission of gas to the combustion chamber at the upper end of each zone of a pair independently of the admission of gas to the combustion chambers at the upper end of the other zone of such pair, substantially as described.

12. In a retort coke oven a pair of heating walls enclosing a distillation chamber between them, each heating wall having on its interior an even number of vertically extending zones for heating gases, each zone having a meshwork of interconnected passages for the transfer of heating gases through said zone in a generally vertical direction, partitions between the passages of consecutive zones preventing the direct transfer of gases between the passages of such zones, a series of combustion chambers at the upper and lower ends of the passages of each zone, there being passages for the delivery of combustible gas and air directly to the lower combustion chambers, there being passages for the delivery of combustible gas to the upper combustion chambers, a relatively short transfer flue above the upper combustion chambers of odd and even numbered zones, there being ports extending between said transfer flues and the combustion chambers beneath them, there being a vertical inspection port extending upwardly above each of said ports, and a damper block for each of said ports, operable through the corresponding inspection port, substantially as described.

13. In a retort coke oven a pair of heating walls enclosing a distillation chamber between them, each heating wall having on its interior an even number of vertically extending zones for heating gases, each zone having on its interior a mesh work of interconnected passages for the transfer of heating gases through said zone in a generally vertical direction, partitions between the passages of consecutive zones preventing the direct transfer of gases between the passages of such zones, a series of combustion chambers at the upper and lower ends of the passages of each zone, there being passages for the admission of combustible gas and air into the lower combustion chambers, there being passages for the delivery of combustible gas to the upper combustion chambers, a relatively short transfer flue above the upper combustion chambers of odd and even numbered zones, there being ports extending between said transfer flues and the combustion chambers beneath them, each transfer flue being local to the zones above which it is located and isolated from all of the other transfer flues, suitable means for controlling the admission of gas and air to the combustion chambers at the lower end of each zone of a pair of zones independently of the admission of air and gas to the combustion chambers at the lower end of the other zone of such pair, and suitable means for controlling the admission of gas to the combustion chambers at the upper end of each zone of a pair independently of the admission of gas to the combustion chambers at the upper end of the other zone of such pair, substantially as described.

14. In a retort coke oven a pair of heating walls enclosing a distillation chamber between them, each heating wall having on its interior a series of vertically extending zones for the transfer of heating gases, each zone having a mesh work of interconnected passages for the transfer of heating gases through said zone in a generally vertical direction, partitions between the passages of consecutive zones preventing the direct transfer of gases between the passages of such zones, a series of combustion chambers at the upper and lower ends of the passages of each zone, there being passages for the delivery of combustion gas and air to the lower combustion chambers, there being passages for the delivery of combustible gas to the upper combustion chambers, and a relatively short transfer flue above the upper combustion chambers of a pair of adjacent zones and local to such zones, there being ports extending between said transfer flues and the combustion chambers beneath them, and suitable means for controlling the admission of combustible gas and air to the various combustion chambers, substantially as described.

15. In a retort coke oven a pair of heating walls enclosing a distillation chamber between them, each heating wall having on its interior a pair of vertically extending zones for heating gases, each zone having a mesh work of inter-connected passages for the transfer of heating gases through said zone in a generally vertical direction, a partition between the zones preventing the direct transfer of gases between the passages of such zones, a series of combustion chambers at the upper and lower ends of both zones, there being passages for the admission of combustible gas and air into the lower combustion chambers of each zone, there being passages for the admission of combustible gas to the upper combustion chambers of each zone, a relatively short transfer flue above the upper combustion chambers of both zones and local to such zones, there being ports extending between said transfer flue and the combustion chambers beneath it, and suitable means for controlling the admission of combustible gas and air to the combustion chambers at the lower end of one zone and for simultaneously controlling the admission of combustible gas to the combustion chambers at the upper end of the other zone, and for reversing the delivery of such combustible gas and air, substantially as described.

16. In a retort coke oven a pair of heating walls enclosing a distillation chamber between them, each heating wall having on its interior a pair of vertically extending zones for heating gases, there being suitable passages within each zone, partitions between the passages of consecutive zones preventing the direct transfer of gases between the passages of such zones, a series of combustion chambers at the upper and lower ends of the passages of each zone, there being passages for the delivery of combustible gas and air into the combustion chambers at the lower end of each zone, there being passages for the delivery of combustible gas into the combustion chambers at the upper end of each zone, a transfer flue above the upper combustion chambers of both zones, there being ports extending between said transfer flues and the combustion chambers beneath it, the transfer flue being local to said zones and combustion chambers, and means for selectively admitting combustible gas and air into the combustion chambers at the lower end of one zone and simultaneously admitting combustible gas into the combustion chambers at the upper end of the other zone, substantially as described.

17. In a retort coke oven a pair of heating walls, each having on its interior a mesh work of interconnected passages for the transfer of heating gases, a series of combustion chambers adjacent to the lower portion of said mesh work of passages, a burner block within each combustion chamber and having a sidewise projecting portion extending beyond the face of the wall within which it is located, there being a slitted opening in the upper portion of said burner block in conjunction with a semi-circular passage within the burner block extending into said sidewise projecting portion and terminating at the upper face thereof, and a partition wall located immediately above the sidewise projecting portion of said burner block, and divided therefrom by a horizontal plane of shear, there being a vertically extending passage in said partition wall registering with said semi-circular passage, and there being suitable passages for the delivery of air into the combustion chambers adjacent to said burner block, substantially as described.

18. In a retort coke oven a pair of heating walls, each having on its interior a mesh work of interconnected passages for the transfer of heating gases, a series of burner blocks adjacent to the lower edge of said mesh work of interconnected passages, each burner block having a sidewise projecting portion extending beyond the face of the wall within which it is located, there being an opening in the upper portion of said burner block in conjunction with a semi-circular passage extending into said sidewise projecting portion and terminating at the upper face thereof, and a partition wall located immediately above the sidewise projecting portion of said burner and divided therefrom by a horizontal plane of shear, there being vertically extending passage in said partition wall registering with said semi-circular passage, substantially as described.

19. In a retort coke oven a pair of heating walls, each having on its interior a mesh work of interconnected passages for the transfer of heating gases, a series of burner blocks within the wall adjacent to one edge of said mesh work of passages, there being an opening in each burner block facing the mesh work of passages in conjunction with a semi-circular passage within the burner block extending into the said sidewise projecting portion and terminating at the same face thereof in which the opening is located, a partition wall adjacent to said face and divided from the burner block by a horizontal plane of shear, and there being a vertically extending passage in the partition wall registering with said semi-circular passage, substantially as described.

20. In a retort coke oven, a pair of heating walls in conjunction with roof and sole portions joining together the upper and lower portions of said heating walls, each of such roof and sole portions comprising a plurality of horizontal courses of blocks set together with the blocks in different courses breaking joints, the blocks in different courses being initially spaced a distance apart substantially equal to the probable amount of expansion incurred in raising the oven to its working temperature for the purpose specified each heating wall having on its interior suitable passages for the transfer of heating gases in a generally vertical direction through said wall, and means for introducing combustion constituents into said passages for combustion purposes, there being suitable passages in the blocks of the courses of the sole portion of the oven to establish communication with the heating gas passages in the heating walls, substantially as described.

21. A bench of coke ovens comprising a series of vertical heating walls spaced apart in conjunction with roof and sole portions joining together the upper and lower portions of said walls, and abutments adjacent to the walls at the extremities of the bench of ovens and located a substantially fixed distance apart, each of said roof and sole portions comprising a series of horizontal courses of blocks with the blocks of the courses breaking joints, the blocks of each roof and sole portion being spaced apart an amount substantially equal to the probable amount of expansion incurred in raising the temperature of the structure to the working temperature, to thereby compensate for sidewise expansion locally in the different parts of the bench of ovens, there being suitable passages in the heating walls for the transfer of heating gases in a generally vertical direction, and there being suitable passages in the soles of the ovens in communication with said heating gas passages, substantially as described.

22. A bench of coke ovens comprising a series of vertical heating walls spaced apart in conjunction with roof and sole portions joining together the upper and lower portions of said walls, and abutments adjacent to the walls at the extremities of the bench of ovens and located a substantially fixed distance apart, each of said roof and sole portions comprising a series of horizontal courses of blocks with the blocks of the courses breaking joints, the blocks of each roof and sole portion being spaced apart an amount substantially equal to the probable amount of expansion incurred in raising the temperature of the structure to the working temperature, to thereby compensate for sidewise expansion locally in the different parts of the bench of ovens, and there being suitable passages in the heating walls for the transfer of heating gases in a generally vertical direction, substantially as described.

ARTHUR ROBERTS.

Witness:
Thomas A. Banning, Jr.